United States Patent Office 3,421,900
Patented Jan. 14, 1969

3,421,900
PROCESSES FOR PREPARATION OF A CHICK GROWTH FACTOR FROM FISH SOLUBLES AND THE RESULTING PRODUCT
Edward Luther Stephenson, R.F.D. 8, Fayetteville, Ark. 72701
No Drawing. Filed Mar. 23, 1965, Ser. No. 442,168
U.S. Cl. 99—7                          4 Claims
Int. Cl. A23k 1/10; A23k 1/18

ABSTRACT OF THE DISCLOSURE

Preparation of chick growth promoting substances by first dialyzing condensed fish solubles or extracts thereof. The dialysate is then subjected to electrophoresis and the fractions selected from the anode side are then fractionally crystallized from acetone and/or methanol to yield the growth factor in crystalline form.

---

This invention relates to new factors which stimulate the growth of animals. Particularly, it relates to two solid crystalline substances of low molecular weight having growth promoting activity when incorporated into the diet of chickens. More particularly, it relates to a process for obtaining these novel substances from extracts of condensed fish solubles. Still more particularly, it relates to a process for isolating said growth promoting substances in substantially pure crystalline form by precipitation from selected solvents.

In accordance with the present invention, condensed fish solubles or a methanol extract thereof, are dialyzed and the resulting dialysate containing the desired material is subjected to electrophoresis to effect further purification of the growth factors. The fractions selected from the anode side of the electrophoresis apparatus are then fractionally crystallized by precipitation, first with methanol to obtain an initial crop of methanol-insoluble crystals, and secondly with acetone to obtain the second crop of acetone-insoluble crystals. Each of these crystalline materials is highly active in stimulating the growth of newly hatched chicks.

In accordance with one embodiment of the present invention, an amount of condensed fish solubles is dialyzed against distilled water to obtain a water solution of the partially purified growth factors as the dialysate. The dialysate, containing the partially purified growth factors, is then evaporated under reduced pressure to obtain an aqueous concentrate of the dialyzed material.

The resulting dialysate concentrate is then subjected to continuous flowing electrophoresis. The fractions collected from the anode side of the electrophoresis apparatus are selected and combined for use in the next step of the purification process. The anode fractions are then reduced in volume by evaporation under reduced pressure to produce an aqueous concentrate having approximately one-tenth the volume of the original fraction. This aqueous concentrate is then contacted with at least two volumes of a lower aliphatic alcohol, such as methanol, to precipitate a solid crystalline fraction which is recovered by filtration or centrifugation. This solid crystalline material, identified as the methanol-insoluble fraction, is active in stimulating the growth of newly hatched chickens fed a diet normally recognized as nutritionally adequate for growth.

In accordance with a further step in the process of my invention, the mother liquors resulting from the precipitation of the methanol-insoluble fraction are then intimately contacted with a sufficient quantity of acetone to impart turbidity to the methanol solution and effect the precipitation of the second solid crystalline fraction. This fraction, otherwise known as the acetone-insoluble fraction, is also active in stimulating the growth of newly hatched chickens fed a diet normally recognized as nutritionally adequate for growth.

In an alternate method of operation of the process of the present invention, a portion of condensed fish solubles is extracted with approximately five volumes of methanol to preferentially extract the organic portion of the crude condensed fish solubles. The methanol extract is then evaporated under reduced pressure and the residual material containing the growth factor is dissolved in sufficient water to produce a concentrate having a volume equal to the volume of the initial condensed fish solubles. This resulting aqueous fraction is then subjected to dialysis, electrophoresis and fractional crystallization in the manner described above.

Example 1

Two pounds of condensed fish solubles of sardine origin are employed in this experiment. Condensed fish solubles are the product obtained by condensing the water resulting from the hydrolytic extraction of oil from fish. Two pounds of said condensed fish solubles equal to a volume of approximately 500 ml. are mixed with five volumes of methanol for a period of several hours to extract the organic material from said fish solubles and precipitate impurities including inorganic salts. The precipitated impurities are removed from the methanolic solution by filtration and the methanol filtrate concentrated in vacuo to a thick syrup which is slurried in approximately 500 ml. of water. The water insoluble material is removed by filtration and the aqueous filtrate containing the extracted material is subjected to dialysis against distilled water at room temperature. The dialysis is continued until the solids content of the water extract drops to a constant value. The resulting large volume of dialysate is concentrated in vacuo to yield an aqueous concentrate of dialyzed material having a volume of approximately 500 ml. The dialysate of condensed fish solubles is then subjected to continuous electrophoretic separation into fractions by the use of a commercially available electrochromatography or electrophoresis apparatus. The particular apparatus used is the Karler-Misco "Angle-Plate" (Micro-Chemical Specialties Company, Berkeley, Calif.). The electrophoresis apparatus is protected from direct sunlight and maintained at a constant temperature of 20° C. A carrier electrolyte comprising an acetic acid sodium acetate buffer having a pH of 5.2 is employed for the electrophoresis. In carrying out the electrophoresis operation, a filter paper curtain supported at an angle to the vertical by a plastic plate is dipped at its upper end into a reservoir of the acetate buffer electrolyte and at the lower end is cut into 22 drip points equally spaced between the anode and the cathode. Fraction collection tubes numbered from 1–22 are positioned below the drip points, numbers 1–11 being the anode fractions and 12-22 being the cathode fractions. An electric current is then applied across the filter paper curtain transverse to the direction of flow of the dialysate. The voltage applied is 500 volts at a wattage of 2.0 milliamperes.

A sample of dialysate concentrate is then slowly applied to a point in the center of the filter paper curtain immediately below the reservoir of buffer solution. The dialysate concentrate is fed to the filter paper curtain in a slow continuous manner by means of a filter paper wick dipping at one end into the dialysate concentrate container having the other end contacting the filter paper curtain at the designated spot. The apparatus is then operated continuously until all of the dialysate concentrate has passed through the electrophoresis apparatus.

Collection tubes are arranged so that the dialysate can be collected from the drip points of the filter paper curtain. The anode fractions which are completely clear, that is, the fraction obtained by combining anode tubes numbers 1 through 10, are then employed as starting material for the precipitation with methanol.

The electrophoretic fractions derived from the anode of volume of approximately 100 ml. were evaporated under reduced pressure to produce a residue of approximatley 10 ml. To this aqueous concentrate is added approximately 35 ml. of methanol which precipitates a white crystalline solid. The solid is removed by centrifugation and dried in vacuo and identified as the methanol-insoluble fraction. This methanol-insoluble fraction is characterized by the following properties: a low molecular weight; the presence of sulfur; slight solubility in water; slight solubility in hydrochloric acid and in aqueous sodium hydroxide solution; insoluble in ether, methanol, acetone and aqueous sodium bicarbonate solution; aqueous solutions of the methanol-insoluble fraction are stable on treatment with acid or on prolonged heating; decomposes without melting when heated to temperatures in excess of 100° C.

The supernatant methanolic liquid is then cooled to approximately 0° C. and acetone added dropwise with constant stirring until the solution becomes turbid. After the first appearance of turbidity, a few additional drops of acetone are added to effect precipitation of a solid crystalline material which is removed by centrifugation and dried in vacuo. This crystalline material is identfied as the acetone-insoluble fraction. This acetone-insoluble fraction is characterized by the following properties: a low molecular weight; the presence of sulfur; slight solubility in water; soluble in hydrochloric acid and aqueous sodium hydroxide; insoluble in ether and aqueous sodium bicarbonate solution.

Example 2

The procedure of Example 1 is repeated omitting the initial methanol extraction step. Thus, two pounds of fish solubles equal to a volume of about 500 ml. are dialyzed against distilled water until the solids content of the fish solubles drops to a constant value. The remaining steps of the procedure of Example 1 are then repeated including the electrophoresis and the methanol and acetone crystallization. The fractions obtained by this alternate method were substantially identical to the corresponding fractions obtained by the procedure of Example 1.

The activity of the two fractions obtained was determined by measuring the effect on the growth of chickens fed an otherwise nutritionally adequate diet. Three chick growth trials were conducted using the fractions isolated by the above procedure. The composition of the basal diet used in the experiments is shown in Table 1. It was adequate in all known growth essentials.

Day-old chicks of mixed sex were weighed and placed into groups which had a weight range of no more than 2 grams. The groups of chicks were distributed at random into pens of 10 birds each. The diets were mixed according to the experimental outline and assigned to pens at random. There were four replications per diet. The chicks were housed in electrically heated battery brooders with raised wire floors, and feed were supplied ad libitum throughout the experimental periods.

An initial pen weight was taken at the beginning of the experiment and the chicks weighed weekly. The weights were recorded to the nearest gram.

The diets fed to the chickens were prepared to test the ability of certain materials to stimulate the growth of newly hatched chicks. Thus, in addition to the basal diet, diets were tested which contained added condensed fish solubles and added solid crystalline fractions including the methanol-insoluble fraction and the acetone-insoluble fraction, as well as diets which included the ash (inorganic salts) from condensed fish solubles.

TABLE 1.—COMPOSITION OF THE HIGH-PROTEIN BASAL CHICK DIET

| Ingredients | Percent |
|---|---|
| Soybean oil meal, 50% protein | 63.8 |
| Corn, finely ground | 32.0 |
| Dicalcium phosphate, feed grade | 1.4 |
| NaCl, iodized | 0.5 |
| $CaCO_3$ | 2.0 |
| DL-Methionine | 0.1 |
| Vitamin A, 20,000 I.U./gm. | 0.0132 |
| Choline chloride | 0.0661 |
| Vitamin E (alpha-tocopherol acetate) | 0.0150 |
| Vitamin B complex mixture [1] | 0.1008 |
| $MnSO_4$ | 0.0176 |
| Vitamin $B_{12}$ mixture [2] | 0.0198 |
| Menadione | 0.0004 |
| Vitamin $D_3$, 2,000,000 I.C.U./gm. | 0.0010 |

[1] Supplied 2 gm. riboflavin, 5 gm. calcium pantothenate, 12.5 gm. niacin and 50 gm. choline on one pound of ground corn as carrier.
[2] Contained 0.1% vitamin $B_{12}$ in $CaCO_3$ as carrier.

TABLE 2.—TRIAL I—GROWTH OF CHICKS FED METHANOL INSOLUBLE FRACTION AND ACETONE-INSOLUBLE FRACTION

| Treatment | Av. wt. gain at 14 days (gm.) | Feed/gain |
|---|---|---|
| (1) Basal diet | 98.40 | 1.28 |
| (2) Basal+2% CFS [1] | [2] 113.40 | 1.29 |
| (3) Basal+methanol-insoluble fractions [3] | [2] 113.75 | 1.36 |
| (4) Basal+acetone-insoluble fraction [3] | [2] 117.60 | 1.32 |

[1] CFS=Condensed fish solubles;
[2] Differences between means (compared to Diet 1) significant at P <.05.
[3] Fractions were added equivalent to 2% CFS; methanol-insoluble fraction added at concentration of approximately 1 gram of crystals per 100 lbs. of basal diet and acetone-insoluble fraction added at concentration of about 10 grams of crystals per 100 pounds of basal diet.

TABLE 3.—TRIAL II—GROWTH OF CHICKS FED METHANOL-INSOLUBLE FRACTION AND ACETONE-INSOLUBLE FRACTION

| Treatment | Av. wt. gain at 7 days (gm.) | Feed/gain |
|---|---|---|
| (1) Basal diet | 36.60 | 1.95 |
| (2) Basal+2% CFS | [1] 47.08 | 1.58 |
| (3) Basal+methanol-insoluble fraction+ash of CFS [2] | [1] 50.00 | 1.85 |
| (4) Basal+acetone insoluble fraction+ash of CFS [2] | [1] 51.95 | 1.57 |

[1] Differences between means (compared to Diet 1) significant at P <.05
[2] Fractions were added equivalent to 2% CFS; methanol-insoluble fraction added at concentration of approximately 1 gram of crystals per 100 lbs. of basal diet and acetone-insoluble fraction added at concentration of about 10 grams of crystals per 100 pounds of basal diet.

TABLE 4.—TRIAL III—GROWTH OF CHICKS FED METHANOL-INSOLUBLE FRACTION AND ACETONE-INSOLUBLE FRACTION PLUS THE ASH OF CFS

| Treatment | Av. wt. gain at 11 days (gm.) | Feed/gain |
|---|---|---|
| (1) Basal diet | 80.75 | 1.82 |
| (2) Basal+ash of CFS | 81.75 | 1.43 |
| (3) Basal+2% CFS | 90.22 | 1.51 |
| (4) Basal+methanol-insoluble fraction+ash of CFS [2] | 90.32 | 1.42 |
| (5) Basal+acetone insoluble fraction+ash of CFS [2] | [1] 92.35 | 1.46 |

[1] Differences between means (compared to Diet 1) significant at P<.05;
[2] Fractions were added equivalent to 2% CFS; methanol-insoluble fraction added at concentration of approximately 1 gram of crystals per 100 lbs. of basal diet and acetone-insoluble fraction added at concentration of about 10 grams of crystals per 100 lbs of basal diet.

The results of the experiments clearly show that stimulation in growth rate of newly hatched chicks occurs when condensed fish solubles, the methanol-insoluble fraction or the acetone-insoluble fraction is added to the basal diet. The experiments further show that the ash derived from condensed fish solubles has little, if any, stimulatory effect on the growth of newly hatched chicks. As can be seen from Table 4, the addition of the ash of condensed fish solubles to the basal medium produced no significant stimulation of growth and, in combination with either the methanol-insoluble fraction or the acetone-insoluble fraction, produced no stimulation in growth beyond that obtained with the diets having only the crystalline fractions added as shown in Table 2.

What is claimed is:

1. The process for producing a crystalline chick growth factor which comprises dialyzing condensed fish solubles to produce a dialysate containing a partially purified chick growth factor, subjecting said dialysate to continuous flowing electrophoresis and selecting the anode fractions resulting from said electrophoresis, contacting said anode fraction with methanol in an amount sufficient to precipitate a substantially pure crystalline chick growth factor, separating and recovering said crystalline factor from the residual mother liquor and contacting said mother liquor with acetone in an amount sufficient to precipitate a second crystalline chick growth factor and separating and recovering said second crystalline growth factor.

2. The process for producing a crystalline chick growth factor which comprises extracting condensed fish solubles with methanol in a amount sufficient to produce a methanol extract of the organic portion of said condensed fish solubles, evaporating said methanol extract to obtain a residue and extracting said residue with water to obtain a water extract of the water soluble organic portion of condensed fish solubles, subjecting said water extract to dialysis to dialyze the water soluble low molecular weight organic portion of condensed fish solubles, subjecting said dialysate to continuous flowing electrophoresis, selecting the anode fractions derived from said electrophoresis, combining said fractions and contacting said combined fractions with methanol in an amount sufficient to precipitate a white solid crystalline substance effective in stimulating chick growth, separating and recovering said white solid chick growth factor from the residual methanol mother liquor, contacting said residual mother liquor at 0° C. with sufficient acetone to impart a turbid appearance thereto and produce a solid crystalline methanol soluble chick growth factor and recovering said methanol-soluble growth factor.

3. The process for producing a crystalline chick growth factor which comprises extracting condensed fish solubles with methanol in an amount sufficient to produce a methanol extract of the organic portion of said condensed fish solubles, evaporating said methanol extract to obtain a residue and extracting said residue with water to obtain a water extract of the water soluble organic portion of condensed fish solubles, subjecting said water extract to dialysis to dialyze the water soluble low molecular weight organic portion of condensed fish solubles, subjecting said dialysate to continuous flowing electrophoresis, selecting the anode fractions derived from said electrophoresis, combining said fractions and contacting said combined fractions with methanol in an amount sufficient to precipitate a white solid crystalline substance effective in stimulating chick growth, and separating and recovering said white solid chick growth factor.

4. A chick growth factor derived from condensed fish solubles being a crystalline substance soluble in methanol and insoluble in acetone and being produced by the method of claim 2.

References Cited

UNITED STATES PATENTS

| | | | |
|---|---|---|---|
| 2,390,074 | 12/1945 | Cohn | 260—122 |
| 2,608,483 | 8/1952 | Hayes | 99—7 |
| 2,566,549 | 9/1951 | Beckwith et al. | 99—7 |
| 3,279,923 | 10/1966 | Bauer et al. | 99—4 |

RAYMOND N. JONES, *Primary Examiner.*

J. M. HUNTER, *Assistant Examiner.*

U.S. Cl. X.R.

99—2